(12) United States Patent
Poh et al.

(10) Patent No.: US 11,066,300 B2
(45) Date of Patent: Jul. 20, 2021

(54) METHOD OF OPERATING A SYNGAS PLANT FOR A WIDE RANGE OF HYDROGEN AND CO CO-PRODUCTION

(71) Applicant: L'Air Liquide, Société Anonyme pour l'Etude et l'Exploitation des Procédés Georges Claude, Paris (FR)

(72) Inventors: Heon-Yong Poh, Singapore (SG); Alexander Roesch, Butzbach (DE); Joseph T. Stroffolino, IV, Pearland, TX (US)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 0 days.

(21) Appl. No.: 16/705,531

(22) Filed: Dec. 6, 2019

(65) Prior Publication Data

US 2021/0171346 A1 Jun. 10, 2021

(51) Int. Cl.
*C01B 3/48* (2006.01)
*C01B 3/56* (2006.01)
*C01B 3/52* (2006.01)
*B01D 53/04* (2006.01)
*B01D 53/14* (2006.01)

(52) U.S. Cl.
CPC .......... *C01B 3/48* (2013.01); *B01D 53/0462* (2013.01); *B01D 53/1475* (2013.01); *C01B 3/52* (2013.01); *C01B 3/56* (2013.01); *C01B 2203/0283* (2013.01); *C01B 2203/042* (2013.01); *C01B 2203/0415* (2013.01); *C01B 2203/0872* (2013.01); *C01B 2203/1235* (2013.01)

(58) Field of Classification Search
CPC . C07C 29/1518; C01B 3/56; C01B 2203/061; C01B 2203/042; C01B 2203/0475
See application file for complete search history.

(56) References Cited

U.S. PATENT DOCUMENTS 10,562,769 B1 * 2/2020 Genkin .................. C01B 3/506

* cited by examiner

*Primary Examiner* — Anthony J Zimmer
*Assistant Examiner* — Syed T Iqbal
(74) *Attorney, Agent, or Firm* — Elwood L. Haynes

(57) ABSTRACT

A method for achieving a gas with a variable hydrogen to carbon monoxide ratio in a system including splitting a warm raw syngas stream into a first portion and a second portion, the second portioning having a portion flowrate. Sending the first portion of the warm raw syngas stream a carbon monoxide separator, thereby producing a first hydrogen enriched stream and a carbon monoxide rich stream. Sending the second portion of the warm raw syngas stream to a water/gas shift reactor, thereby producing a shifted syngas stream. Combining the first hydrogen enriched stream and the second hydrogen enriched stream and sending the combined stream to a hydrogen separator, thereby producing a product hydrogen stream having a hydrogen flowrate, and varying the hydrogen flowrate by increasing the portion flowrate.

4 Claims, 5 Drawing Sheets

METHOD OF OPERATING A SYNGAS PLANT FOR A WIDE RANGE OF HYDROGEN AND CO CO-PRODUCTION

BACKGROUND

Reforming of a hydrocarbon feed, possibly natural gas, coal, or any carbon containing material, is typically performed in order to produce a synthesis gas rich in hydrogen by converting the carbon in the methane to carbon monoxide and freeing hydrogen from the steam. Depending upon the composition of the hydrocarbon feed, the reforming conditions, the catalyst used, and many other variables, the synthesis gas product from such steam/methane reforming can vary widely as to its composition in general, and its H2/CO ratio in particular.

The synthesis gas will be used in one or more different downstream processes to make one or more chemical products of commercial value. But the downstream process may require a tailored ratio of hydrogen to carbon monoxide. If so, these processes will naturally operate more efficiently when the H2/CO ratio in their feed is carefully controlled. The current state of the art has few options when it comes to carefully controlling this ratio.

Accordingly, it is desirable to be able to control the H2/CO ratio of a syngas reformer so as to adjust the synthesis gas product from that reformer to better meet or otherwise suit the requirements of the specific downstream processing unit or units for which that particular synthesis gas product will be used as a feed material.

SUMMARY

A method for achieving a gas with a variable hydrogen to carbon monoxide ratio in a system including splitting a warm raw syngas stream into a first portion and a second portion, the second portioning having a portion flowrate. Sending the first portion of the warm raw syngas stream a carbon monoxide separator, thereby producing a first hydrogen enriched stream and a carbon monoxide rich stream. Sending the second portion of the warm raw syngas stream to a water/gas shift reactor, thereby producing a shifted syngas stream. Combining the first hydrogen enriched stream and the second hydrogen enriched stream and sending the combined stream to a hydrogen separator, thereby producing a product hydrogen stream having a hydrogen flowrate, and varying the hydrogen flowrate by increasing the portion flowrate.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
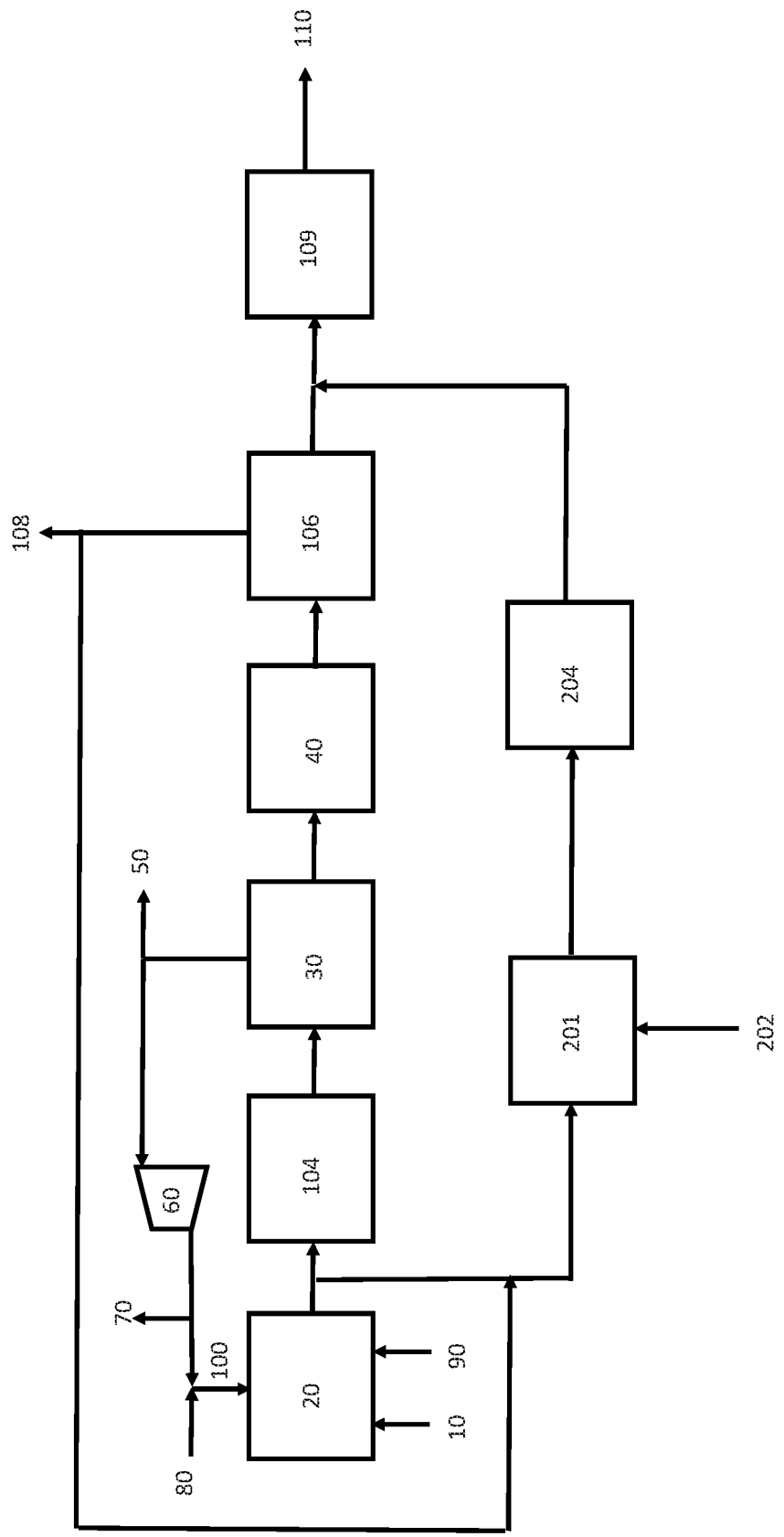
FIG. 1 is a schematic representation in accordance with one embodiment of the present invention.

10=Hydrocarbon Feedstock
20=Syngas Generator
30=CO2 Removal System
40=Temperature Swing Adsorber (TSA)
50=CO2 Vent to Atmosphere
60=CO2 Compressor
70=HP CO2 Product Export
80=CO2 Import
90=Oxygen Rich Gas
100=CO2 Recycle to Syngas Generation
101=Warm Raw Syngas
102=First Portion (of Warm Raw Syngas)
103=Second Portion (of Warm Raw Syngs)
104=First Syngas Cooler
105=First Cooled Syngas Stream
106=CO Separator
107=Hydrogen Rich Syngas Stream
108=Carbon Monoxide Rich Stream
109=Hydrogen Separator
110=Hydrogen Rich Stream
201=Water-Gas Shift Reactor
202=Steam (to Water-Gas Shift Reactor)
203=Shifted Syngas
204=Second Syngas Cooler
205=Second Cooled Syngas Stream
301=Portion of Carbon Monoxide Rich Stream

DETAILED DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Upstream of the implementation of the present invention, hydrocarbon feedstock 10 is mixed with steam (not shown) and enters synthesis gas generation unit 20, which may be steam reforming, autothermal reforming of partial oxidation reforming, to generate a synthesis gas stream comprising mainly of hydrogen ($H_2$), carbon monoxide (CO), and carbon dioxide ($CO_2$). In the case of autothermal reforming or partial oxidation, oxygen ($O_2$) 90 may be used in the synthesis gas generation unit. $CO_2$ stream 80 may be imported from the battery limit and mixed with hydrocarbon feedstock 10. $CO_2$ stream 100 may be recycled from downstream $CO_2$ removal system 20 and mixed with hydrocarbon feedstock 10. The hot synthesis gas may be cooled exiting the synthesis gas generation unit by generating high pressure steam or a quench, thus producing warm raw syngas 101.

Figure 2:
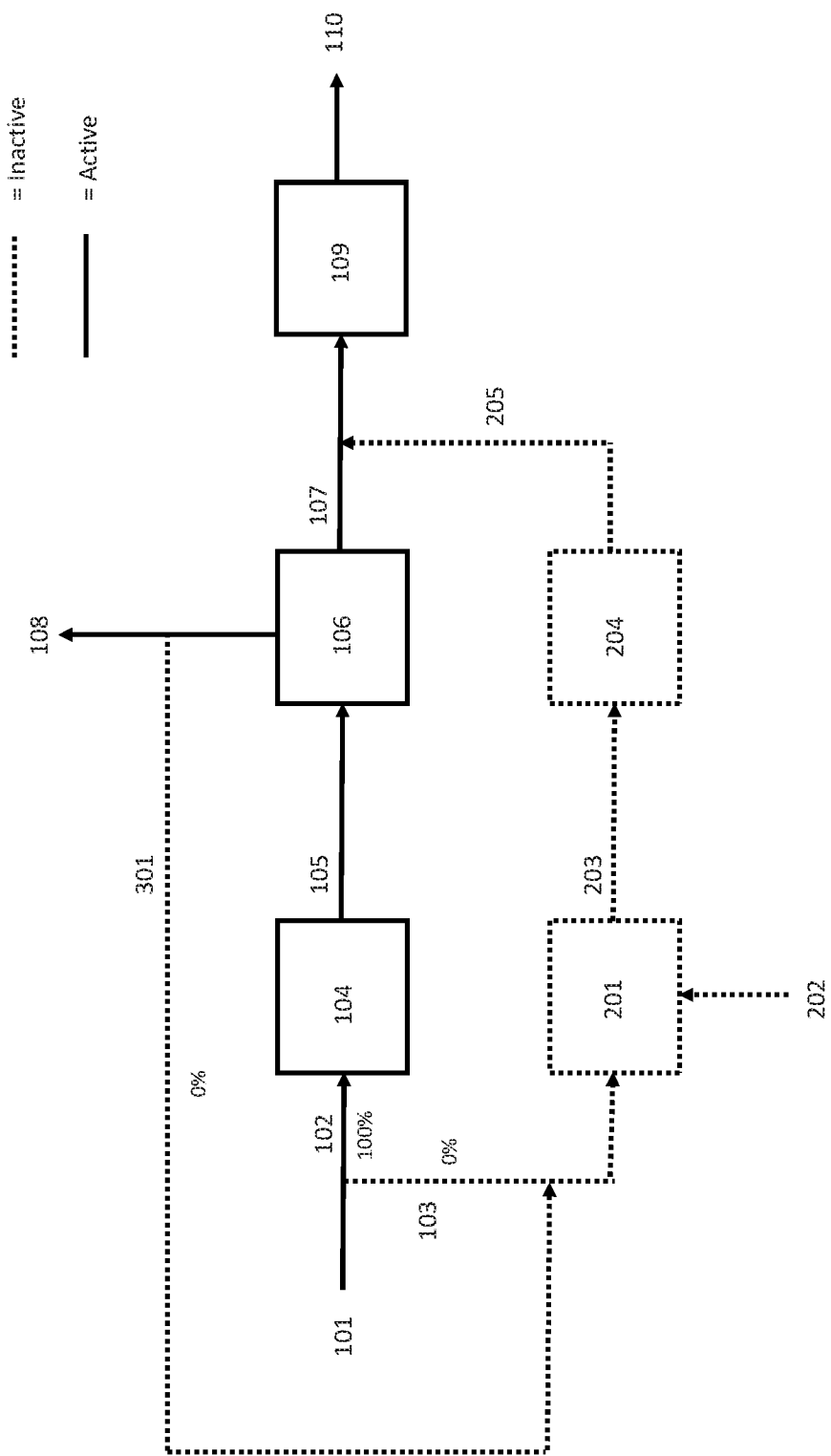
FIG. 2 is a schematic representation in accordance with one embodiment of the present invention.

As illustrated in FIGS. 1 and 2, in one embodiment of the present invention, the method is utilized to produce 100% of design the CO production. This mode of operation produces the most amount of pure CO product and the least amount of pure $H_2$ product. In some embodiments, warm raw syngas 101 is split into at least first portion 102 and second portion 103. In the instant embodiment, warm raw syngas 101 is not split. Warm raw syngas 101 may be further cooled 104 by preheating other streams, air cooling, and/or water cooling, thereby producing first cooled syngas stream 105. During this process, water may condense and be separated from the synthesis gas stream (not shown).

$CO_2$ is removed from the saturated synthesis gas via a TSA scrubbing system 40. A temperature swing adsorption (TSA) unit 40 may be used to remove residual $CO_2$ and water below 0.2 mol %. The dry, $CO_2$-free synthesis gas may be cryogenically separated in cold box 106 to produce CO rich product stream 108, hydrogen-rich gas (HRG) stream 107, and a residual gas stream which may be sent to the fuel system (not shown). HRG stream 107 is sent to hydrogen purification unit (HPU) 109, which may be a pressure swing adsorption (PSA) or membrane, to produce $H_2$ rich product 110, and a residual gas stream which may be sent to the fuel system (not shown). During this mode of operation, Water gas shift reactor 201 and second syngas cooler 204 are bypassed and idle.

Figure 3:
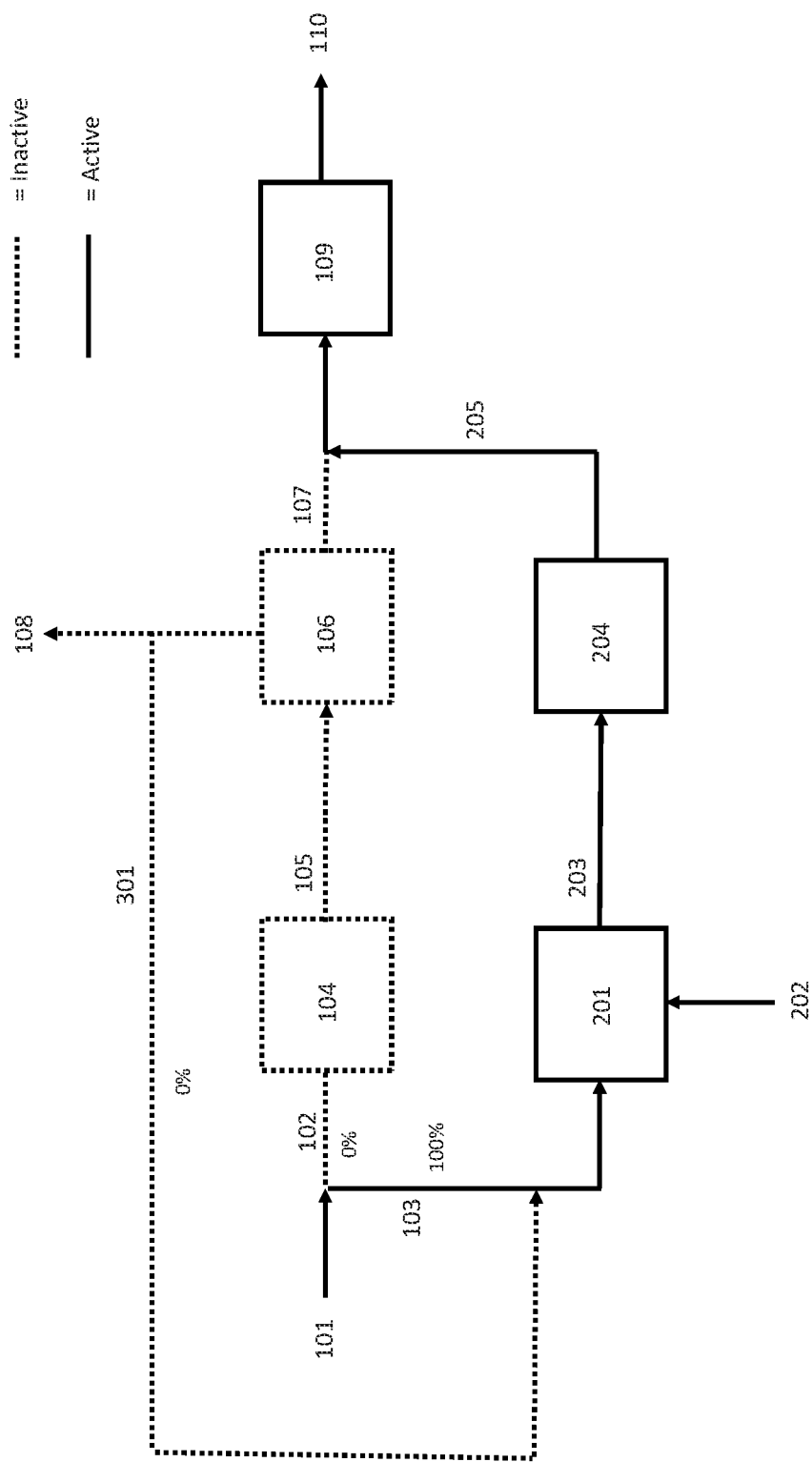
FIG. 3 is a schematic representation in accordance with one embodiment of the present invention.

As illustrated in FIGS. 1 and 3, in another embodiment of the present invention, the method is utilized to produce 100% of design $H_2$ production. This mode of operation produces the most amount of pure $H_2$ product and no pure CO product. In some embodiments, warm raw syngas 101 is split into at least first portion 102 and second portion 103. In the instant embodiment, warm raw syngas 101 is not split, however, the entire flowrate follows path 103, and first syngas cooler 104, TSA 40, and CO separator 106 are bypassed.

Warm raw syngas stream 103 and steam stream 202 enter water gas shift reactor 201 which converts CO to $H_2$ and $CO_2$, thus producing shifted syngas 203. The shifted gas may be cooled 204 by preheating other streams, air cooling, and/or water cooling, thus producing second cooled syngas stream 205. During this process water may condense and be separated from the synthesis gas stream (not shown). The cooled shifted gas may then be sent to the $CO_2$ removal system (not indicated) if $CO_2$ is a desired product or feedstock. HRG stream 107 is sent to hydrogen purification unit (HPU) 109, which may be a pressure swing adsorption (PSA) or membrane, to produce $H_2$ rich product 110, and a residual gas stream which may be sent to the fuel system (not shown).

Figure 4:
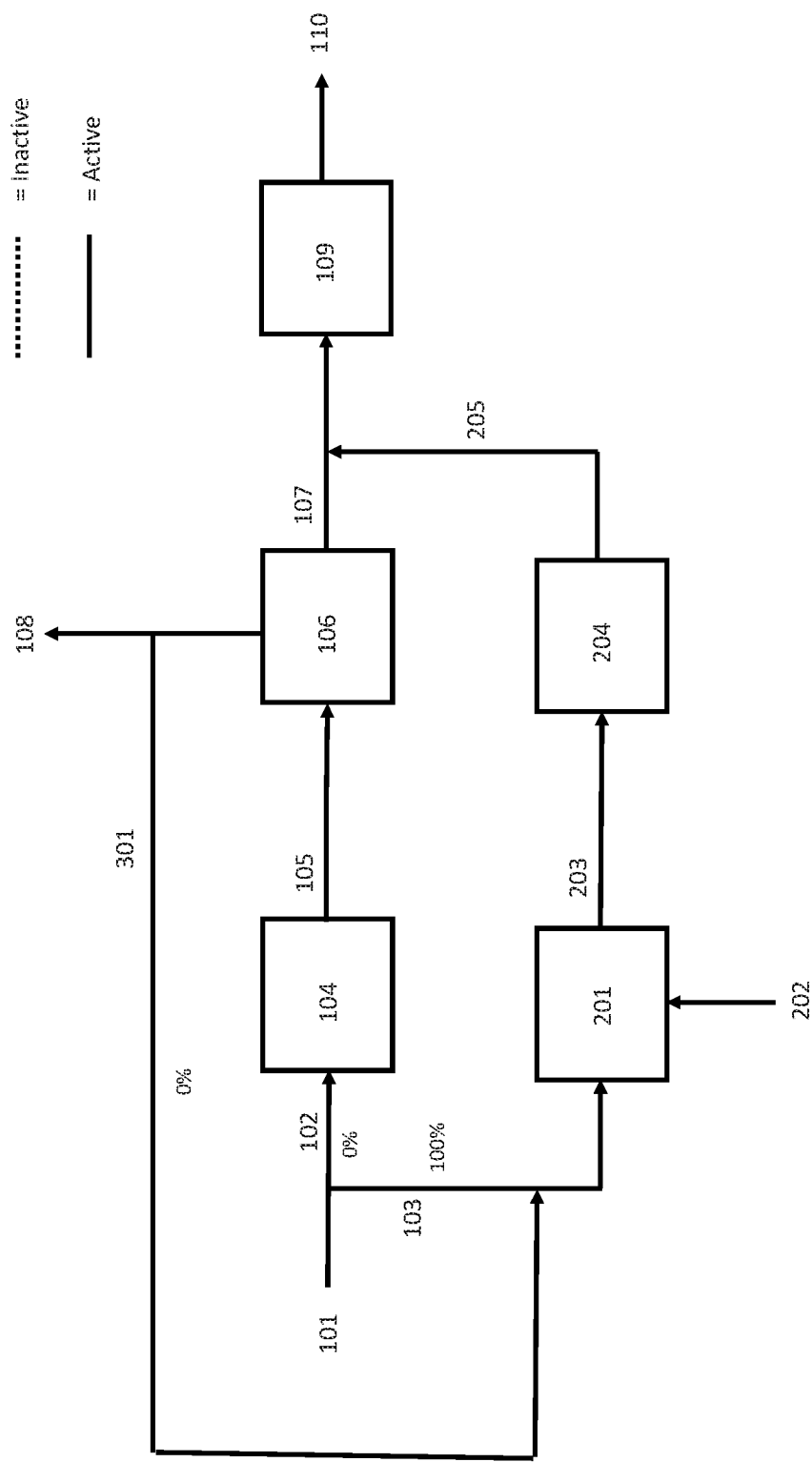
FIG. 4 is a schematic representation in accordance with one embodiment of the present invention.

As illustrated in FIGS. 1 and 4, in another embodiment of the present invention, the method is utilized to provide flexible $H_2$ and CO production. This mode of operation diverts any synthesis gas not needed to produce the desired amount of pure CO product to instead produce additional pure $H_2$ product. Ordinarily, less demand for pure CO product requires a reduced load of the entire facility and of all product outputs. This is caused by the implicit ratio of $H_2$ and CO quantities produced in the synthesis gas generation unit and the subsequent amount of heat converted to a potential steam product.

In the instant embodiment, warm raw syngas 101 is split into at least first portion 102 and second portion 103. First portion 12 may be further cooled 104 by preheating other streams, air cooling, and/or water cooling, thereby producing first cooled syngas stream 105. During this process, water may condense and be separated from the synthesis gas stream (not shown).

$CO_2$ is removed from the saturated synthesis gas via an acid gas scrubbing system 30. A temperature swing adsorption (TSA) unit 40 may be used to completely remove residual $CO_2$ and water. The dry, $CO_2$-free synthesis gas may be cryogenically separated in cold box 106 to produce CO rich product stream 108, hydrogen-rich gas (HRG) stream 107, and a residual gas stream which may be sent to the fuel system (not shown). HRG stream 107 is sent to hydrogen purification unit (HPU) 109, which may be a pressure swing adsorption (PSA) or membrane, to produce $H_2$ rich product 110, and a residual gas stream which may be sent to the fuel system (not shown).

Second portion 103 and an if required additional steam stream 202 enter water gas shift reactor 201 which converts CO to $H_2$ and $CO_2$, thus producing shifted syngas 203. The shifted gas may be cooled 204 by preheating other streams, air cooling, and/or water cooling, thus producing second cooled syngas stream 205. During this process water may condense and be separated from the synthesis gas stream (not shown). The cooled shifted gas may then be sent to the $CO_2$ removal system (not shown) if $CO_2$ is a desired product or feedstock. HRG stream 107 is sent to hydrogen purification unit (HPU) 109, which may be a pressure swing adsorption (PSA) or membrane, to produce $H_2$ rich product 110, and a residual gas stream which may be sent to the fuel system (not shown).

The shifting of second portion 103, as required, decouples the link between pure CO product amount and all other amounts of potential co-products. Therefore, synthesis gas generation unit 20 may remain at 100% design capacity in spite of cold box 106 running at a reduced load. During this time, hydrogen rich stream 110 and optionally, steam and $CO_2$ products may remain at 100% design capacity.

Figure 5:
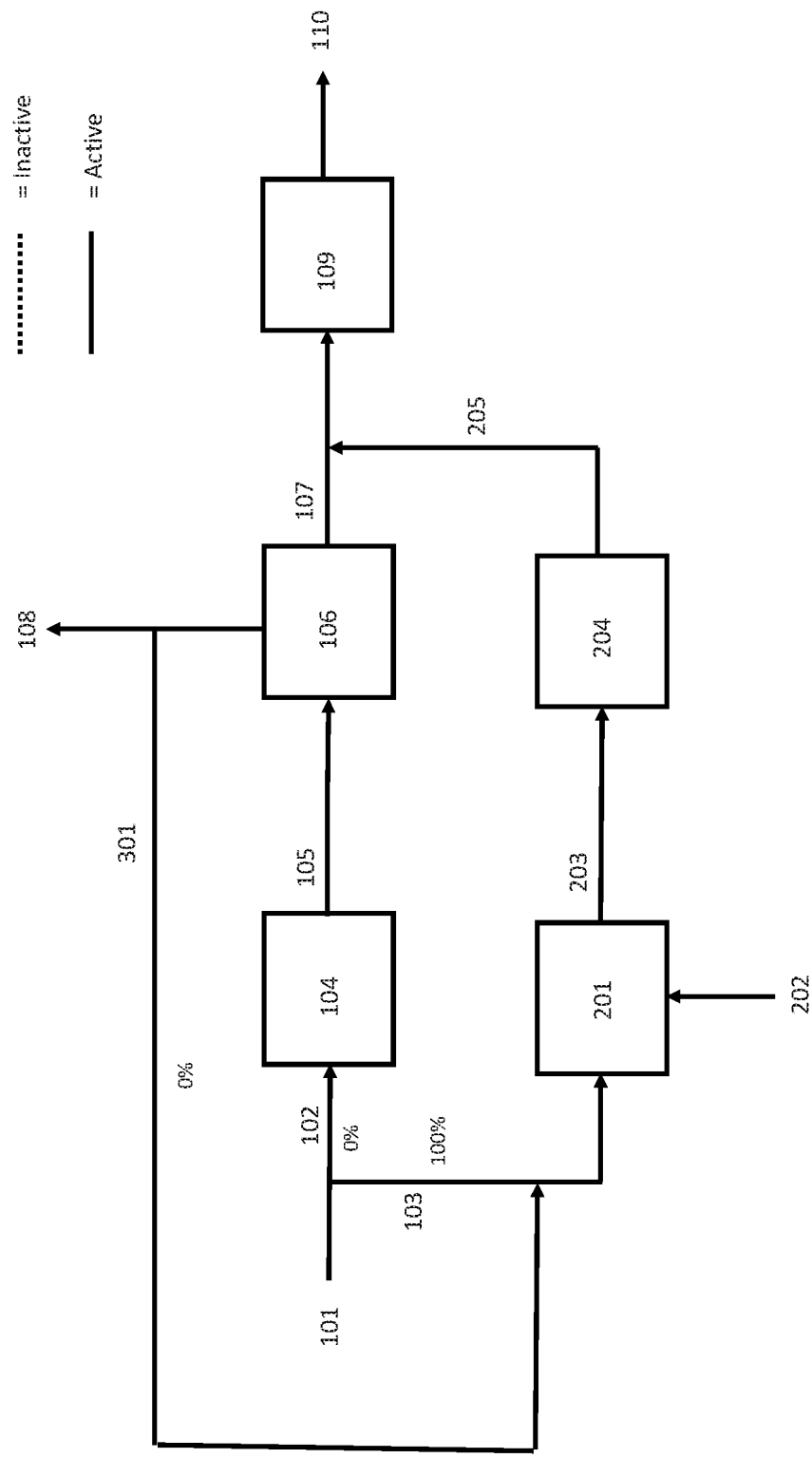
FIG. 5 is a schematic representation in accordance with one embodiment of the present invention.

As illustrated in FIGS. 1 and 5, in another embodiment of the present invention, the method is utilized to provide instantaneous CO back-up. This mode of operation optimizes pure $H_2$ product production while pure CO product is not being consumed but may be instantaneously needed.

In the instant embodiment, warm raw syngas 101 is split into at least first portion 102 and second portion 103. First portion 12 may be further cooled 104 by preheating other streams, air cooling, and/or water cooling, thereby producing first cooled syngas stream 105. During this process, water may condense and be separated from the synthesis gas stream (not shown).

$CO_2$ is removed from the saturated synthesis gas via an acid gas scrubbing system 30. A temperature swing adsorption (TSA) unit 40 may be used to remove residual $CO_2$ and water below 0.2 mol %. The dry, $CO_2$-free synthesis gas may be cryogenically separated in cold box 106 to produce CO rich product stream 108, hydrogen-rich gas (HRG) stream 107, and a residual gas stream which may be sent to the fuel system (not shown). HRG stream 107 is sent to hydrogen purification unit (HPU) 109, which may be a pressure swing adsorption (PSA) or membrane, to produce $H_2$ rich product 110, and a residual gas stream which may be sent to the fuel system (not shown).

Second portion 103 and steam stream 202 enter water gas shift reactor 201 which converts CO to $H_2$ and $CO_2$, thus producing shifted syngas 203. The shifted gas may be cooled 204 by preheating other streams, air cooling, and/or water cooling. During this process water may condense and be separated from the synthesis gas stream (not shown). The cooled shifted gas may then be sent to the $CO_2$ removal system (not shown) if $CO_2$ is a desired product or feedstock. HRG stream 107 is sent to hydrogen purification unit (HPU) 109, which may be a pressure swing adsorption (PSA) or membrane, to produce $H_2$ rich product 110, and a residual gas stream which may be sent to the fuel system (not shown).

At any time, the plant may begin to stop fueling but rather exporting carbon monoxide rich stream 108 to the battery limit since cold box 106 is cold and running. The recycle 301 and shifting of the carbon monoxide rich stream 108 required to maintain cold box minimum operation achieves product valorization at hydrogen rich stream 110 pricing rather than at fuel value. The typical turndown of cold box 106 may be 40% of design capacity, below which the unit may not be successfully operated. The recycle and shifting of carbon monoxide rich stream 301 while cold box 106 is at 40% allows an export quantity of any amount carbon monoxide rich stream 108, ranging from 0% to 100% of design capacity. Since cold box 106 is not idle, any desired product output may be achieved online by adjusting the amount of synthesis gas contributing toward.

Stream 103 has a portion flowrate. Stream 301 has a carbon monoxide portion flowrate. Stream 119 has hydrogen flowrate. In one embodiment of the present invention, the hydrogen flowrate is varied by increasing (or decreasing) the portion flowrate. In another embodiment, the hydrogen flowrate is varied by combining the carbon monoxide rich portion flowrate with the portion flowrate. The portion flowrate and/or carbon monoxide portion flowrate may be 0%. The portion flowrate and/or carbon monoxide portion flowrate may be 100%. The portion flowrate and/or carbon monoxide portion flowrate vary between 0% and 100%.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for achieving a gas with a variable hydrogen to carbon monoxide ratio in a system comprising:
    a warm raw syngas stream, a first syngas cooler,
    a second syngas cooler,
    a water/gas shift reactor,
    an acid gas scrubber,
    a temperature swing adsorber
    a carbon monoxide separator, and
    a hydrogen separator,
    the method comprising:
        splitting the warm raw syngas stream into a first portion and a second portion, the second portion having a hydrogen portion flowrate, and the warm raw syngas stream having a total syngas flow rate,
        sending the first portion of the warm raw syngas stream to the first syngas cooler, then to the acid gas scrubber, temperature swing adsorber, and carbon monoxide separator, thereby producing a first hydrogen enriched stream and a carbon monoxide rich stream having a carbon monoxide portion flowrate,
        sending the second portion of the warm raw syngas stream to the water/gas shift reactor, thereby producing a shifted syngas stream, then sending the shifted syngas stream to the second syngas cooler, thereby producing a second hydrogen enriched stream,
        combining the first hydrogen enriched stream and the second hydrogen enriched stream and sending the combined stream to the hydrogen separator, thereby producing a product hydrogen stream having a hydrogen flowrate,
        varying the hydrogen flowrate by varying the second portion flowrate, while maintaining a constant total syngas flow rate.

2. The method of claim 1, further comprising:
    removing at least a portion of the carbon monoxide rich stream,
    varying the hydrogen flowrate by combining the carbon monoxide rich portion with the second portion of the warm raw syngas stream.

3. The method of claim 1, wherein at a predetermined portion flowrate,
    sending a portion of the shifted syngas stream to the first syngas cooler, thereby producing a cooled portion,
    combining the cooled portion with the second hydrogen enriched stream, thereby producing a combined stream,
    sending the combined stream to the hydrogen separator, thereby producing the product hydrogen stream having the hydrogen flowrate.

4. The method of claim 3, wherein the predetermined flowrate is 100%.

* * * * *